July 5, 1938.  J. D. HANAWALT  2,122,419
MANUFACTURE OF CALCIUM METAL
Filed Aug. 11, 1936
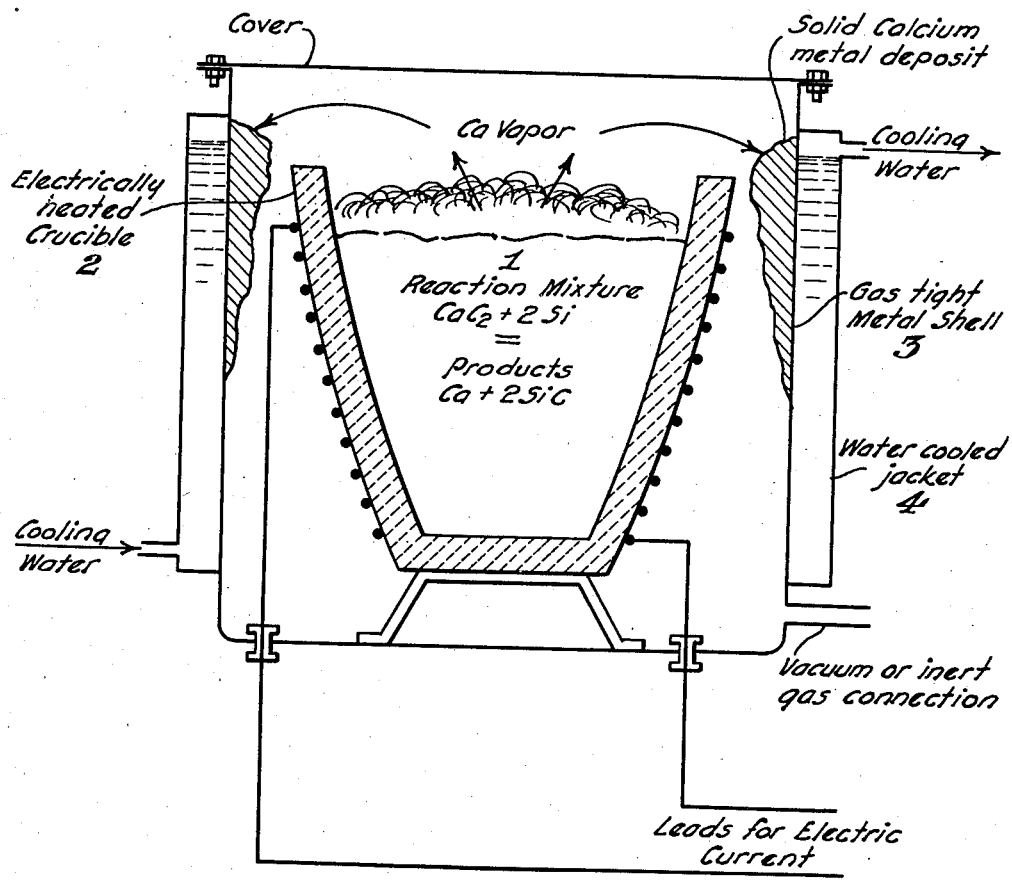
INVENTOR
Joseph D. Hanawalt
BY Griswold & Burdick
ATTORNEYS Patented July 5, 1938

2,122,419

UNITED STATES PATENT OFFICE 2,122,419

MANUFACTURE OF CALCIUM METAL

Joseph D. Hanawalt, Midland, Mich., assignor to The Dow Chemical Company, Midland, Mich., a corporation of Michigan Application August 11, 1936, Serial No. 95,462

12 Claims. (Cl. 75—67)

The invention relates to a novel method of making calcium metal.

I have discovered that by heating silicon with calcium carbide to a sufficient temperature, metallic calcium is formed, apparently according to the following equation:

$$CaC_2 + 2Si = Ca + 2SiC$$

Instead of silicon I may use metallic silicides, or mixtures of silicon or silicides with other metals, such as iron or aluminum. The ferrosilicons, $Fe_xSi_y$, in which the ratio of $y$ to $x$ in the foregoing formula exceeds 1, liberate calcium metal from calcium carbide in amount proportional to the avialable silicon which corresponds to the difference, $y-x$, producing the by-product, $Fe_xSi_x$, containing about 33.5 per cent of silicon by weight. The ferrosilicon employed should therefore contain more than 33.5 per cent of silicon. Likewise, a mixture of aluminum and silicon reacts with calcium carbide. In such reactions the carbon of the carbide produces silicon carbide, SiC, or carborundum. Substantially all the silicon is converted into silicon carbide if silicon alone be employed, but when iron, aluminum, or another metal is associated with it, a part of the silicon may also combine with the other metal, yielding a silicon alloy or compound. The yield of calcium, however, appears to be directly proportional to the amount of silicon carbide produced. The reaction occurs apparently above about 1150° C. and proceeds smoothly and rapidly at temperatures between 1300° and 1600° C.

The drawing illustrates diagrammatically the apparatus in which the method is practiced.

In carrying out the reaction, the materials are first finely ground, if necessary, and then intimately mixed in approximately the proportions of one mole of calcium carbide ($CaC_2$) for each two moles of available silicon in the silicon-containing material. The mixture is placed in a suitable vessel, and heated to reaction temperature at sub-atmospheric pressure, or in a inert gas such as helium. The calcium metal is liberated from the reaction mixture as a vapor and may be condensed upon a suitable cooled surface, e. g. of iron or steel. For example, referring to the drawing the mixture 1 of calcium carbide and silicon-containing material may be placed in an electrically heated crucible 2 of a material preferably non-reactive to calcium, such as carborundum, which is surrounded by a gas-tight metal shell 3, the shell being cooled by the water jacket 4 so as to act as a condensing surface for the vaporized calcium. A graphite crucible, although graphite is somewhat reactive to calcium, may be used if the calcium vapor evolved is immediately removed from the vicinity of the crucible. This can be accomplished by having the condensing surface in close proximity to the reaction mixture, or by sweeping the calcium vapor away from the reaction vessel to the condensing surface by a stream of inert gas or in other manner. The condensed product is obtained in substantially pure form.

The following examples are illustrative of the invention:

Example I 4 pounds of commercial calcium carbide (containing 75.8 per cent of $CaC_2$) and 20 pounds of a ferrosilicon alloy (containing 50 per cent of silicon, the balance being largely iron), both powdered, were mixed together and placed in an open graphite vessel surrounded by a water-cooled vacuum-tight steel jacket in close proximity to the vessel. The interior of the jacket was connected to a vacuum pump which pumped off the relatively non-condensible gases evolved during the heating operation. The temperature of the mixture was raised to between 1500° and 1600° C. by passing an electric current through the graphite vessel, bringing about reaction and liberating calcium vapor. During the heating operation, the pressure in the vessel was maintained below about 2 millimeters of mercury, and the calcium vapor which was evolved from the mixture condensed on the inner surface of the jacket in bright crystals as substantially pure calcium. The yield was 1.84 pounds of calcium. The residue in the vessel was largely a mixture of SiC, FeSi, and $FeSi_2$.

Example II

A similar experiment to that of Example I was carried out using 7 pounds of commercial calcium carbide and 7 pounds of a ferrosilicon alloy containing 75 per cent of silicon. The yield was 2.41 pounds of substantially pure calcium, and the residue in the vessel was largely a mixture of SiC, FeSi, and undecomposed $CaC_2$.

Example III

A similar experiment to that of Example I was carried out using a powdered mixture of 7 pounds of commercial calcium carbide and 7 pounds of a ferrosilicon alloy containing 90 per cent of silicon. The yield was 3.03 pounds of substantially pure calcium and the residue was largely SiC, $FeSi_2$, and unused $CaC_2$.

*Example IV*

A similar experiment to that of Example I was carried out using 8 pounds of powdered commercial calcium carbide mixed with 4 pounds of commercial powdered silicon (containing 96.4 per cent of Si, the balance being largely Fe). The yield was 2.64 pounds of substantially pure calcium and the residue in the vessel was largely SiC and undecomposed $CaC_2$.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of making metallic calcium, the step which consists in heating a mixture of calcium carbide and metallic material containing silicon to a temperature capable of liberating calcium.

2. In a method of making metallic calcium, the step which consists in heating a mixture of calcium carbide and metallic material containing silicon to a temperature above about 1150° C.

3. In a method of making metallic calcium, the step which consists in heating a mixture of calcium carbide and silicon to a temperature above about 1150° C.

4. In a method of making metallic calcium, the step which consists in heating a mixture of calcium carbide and a ferro-silicon alloy to a temperature above about 1150° C.

5. In a method of making metallic calcium, the step which consists in heating a mixture of calcium carbide and a ferro-silicon alloy containing more than 33.5 per cent of silicon to a temperature above about 1150° C.

6. In a method of making metallic calcium, the steps which consist in heating a mixture of powdered calcium carbide and metallic material containing silicon to a temperature between about 1150° and 1600° C., whereby calcium vapor is evolved, and condensing the vapor.

7. In a method of making metallic calcium, the steps which consist in heating a mixture of powdered calcium carbide and a ferrosilicon alloy containing more than 33.5 per cent of silicon to a temperature between about 1150° and 1600° C., whereby calcium vapor is evolved, and condensing the vapor.

8. In a method of making metallic calcium, the steps which consist in heating a mixture of powdered calcium carbide and metallic material containing silicon under reduced pressure to a temperature between 1150° and 1600° C., whereby calcium vapor is evolved, and condensing the vapor.

9. In a method of making metallic calcium, the steps which consist in heating a mixture of powdered calcium carbide and metallic material containing silicon in an inert gas to a temperature between 1150° and 1600° C., whereby calcium vapor is evolved, and condensing the vapor.

10. In a method of making metallic calcium, the steps which consist in heating a mixture of powdered calcium carbide and an iron-silicon alloy containing more than 33.5 per cent of silicon under reduced pressure to a temperature between 1300° and 1600° C., whereby calcium vapor is evolved, and condensing the vapor.

11. In a method of making metallic calcium, the steps which consist in heating a mixture of powdered calcium carbide and a ferrosilicon alloy containing more than 33.5 per cent of silicon in an inert gas to a temperature between 1300° and 1600° C., whereby calcium vapor is evolved, and condensing the vapor.

12. In a method of making metallic calcium, the steps which consist in heating a mixture comprising calcium carbide and silicon to a temperature above about 1300° C., whereby calcium vapor is evolved, and condensing the vapor.

JOSEPH D. HANAWALT.